C. W. BOARD.
CUTTER ATTACHMENT FOR CALENDERS.
APPLICATION FILED MAY 18, 1918.
1,283,462.
Patented Nov. 5, 1918.
2 SHEETS—SHEET 1.
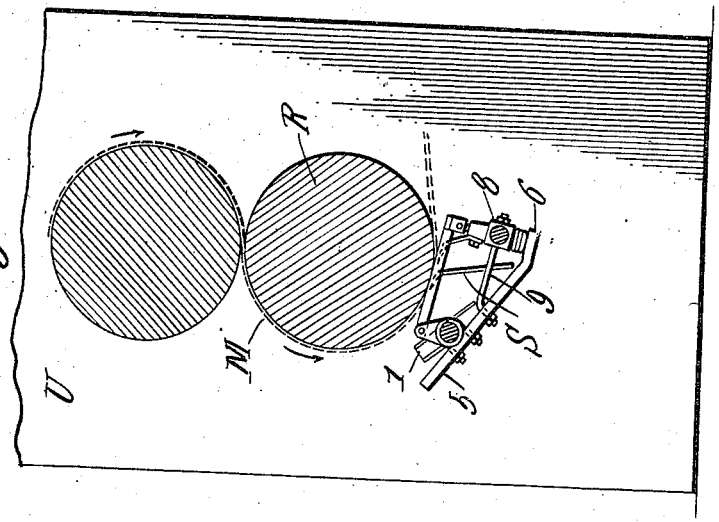
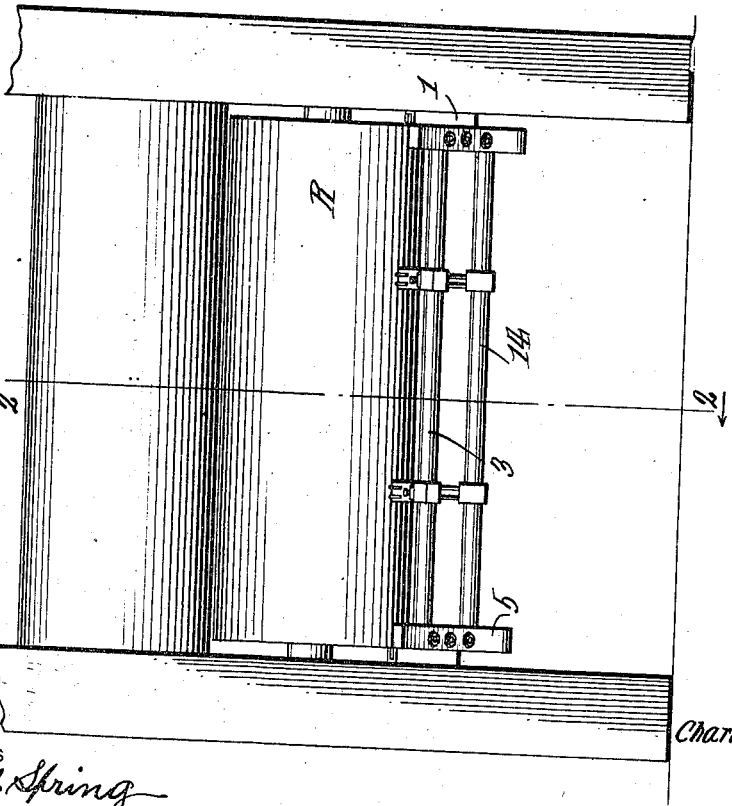
WITNESSES
INVENTOR
Charles W. Board
BY
ATTORNEY C. W. BOARD.
CUTTER ATTACHMENT FOR CALENDERS.
APPLICATION FILED MAY 18, 1918.
1,283,462.
Patented Nov. 5, 1918.
2 SHEETS—SHEET 2.
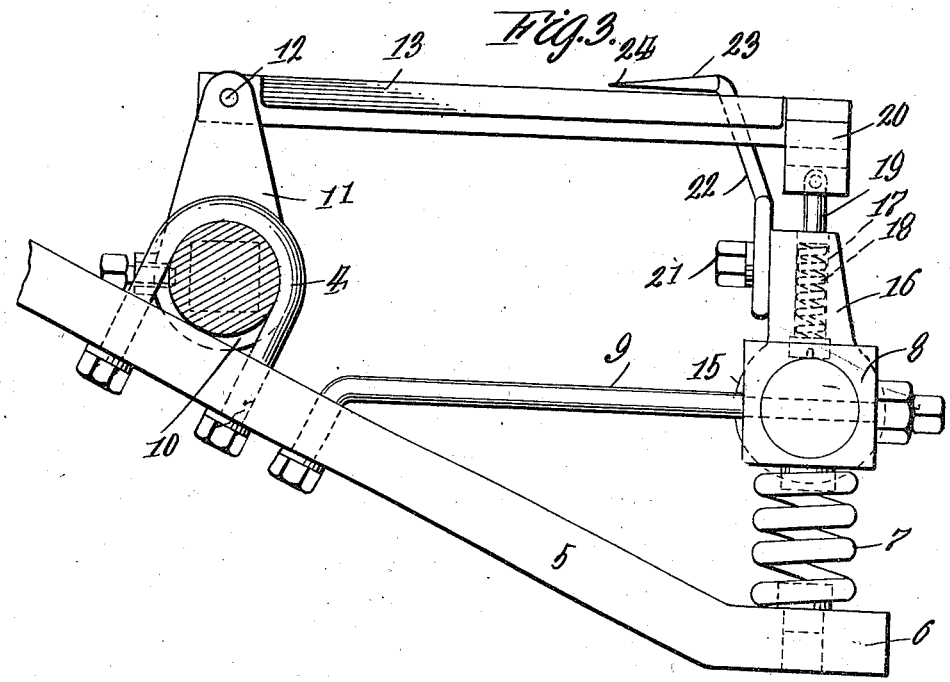
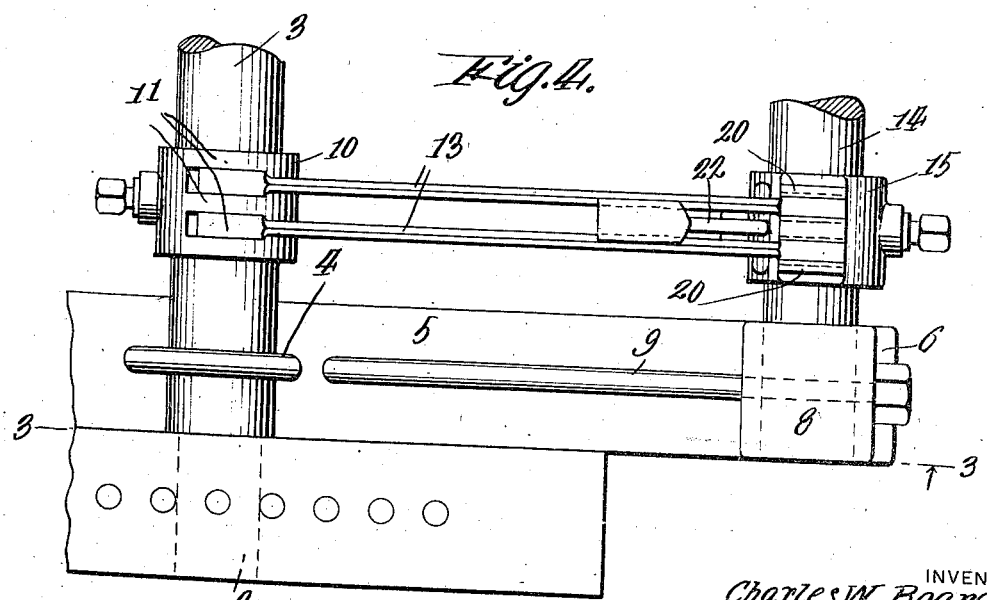
WITNESSES
INVENTOR
Charles W. Board
BY
ATTORNEY

UNITED STATES PATENT OFFICE.

CHARLES W. BOARD, OF AKRON, OHIO.

CUTTER ATTACHMENT FOR CALENDERS.

1,283,462. Specification of Letters Patent. Patented Nov. 5, 1918.

Application filed May 18, 1918. Serial No. 235,341.

*To all whom it may concern:*

Be it known that I, CHARLES W. BOARD, a citizen of the United States, residing at Akron, in the county of Summit and State of Ohio, have invented certain new and useful Improvements in Cutter Attachments for Calenders, of which the following is a specification.

This invention relates to cutting machines, and more especially to those having fixed cutters to which the work is fed by a roller; and the object of the same is to produce a machine for cutting strips from sheets of material, to make provision for scraping the strip from the roller, and to allow for movement of the knives in case a lump in the material occurs.

Other objects will appear in the following specification and claims, and attention is directed to the drawings herewith and in which:—

Figure 1 is a rear elevation of this machine,

Fig. 2 is a section on the line 2—2 of Fig. 1,

Fig. 3 is an end view, being a section on about the line 3—3 of Fig. 4, and

Fig. 4 is a plan view of one pair of blades or knives,

Figs. 3 and 4 are on an enlarged scale.

I have shown my invention as applied to the lowermost roller R of a series which are journaled in upright standards U and turn in the direction of the arrows in Fig. 2. The material indicated at M may be any thin material in sheet form, and the letter R may designate a calender roller. The purpose of the invention is to cut a narrow strip S from this matter, and at the same time to scrape it off the roller R.

In suitable supports 1 carried by the standards U are mounted the extremities 2 of a cross rod 3 extending by preference the whole length of the machine. Clipped at 4 to this rod are two hangers 5 extending obliquely downward and having flat feet 6 at their lower ends. Each foot supports a stout coiled spring 7, and each spring supports a box 8, the box being additionally supported from the hanger by a spring arm 9. The cross rod is rigidly but adjustably supported, and the hangers also are rigidly supported by the cross rod, but it will be observed that the boxes are yieldingly supported on the feet of the hangers for a purpose yet to appear.

Mounted at intervals on the cross rods 3 are collars 10, each having three upstanding ears 11 between which at 12 are pivoted the rear ends of two knives or blades 13 standing in strict parallelism and with their cutting edges uppermost so as to contact with the lower side of the roller R and to sever the material carried thereby. Mounted in the boxes is a cross rod 14, and at intervals thereon at 15 collars are attached at points to be opposite the collars 10. Each collar 15 has an upstanding boss 16 containing a pair of sockets 17 and in each socket is a spring 18 disposed beneath the lower end of a plunger 19, the latter pivotally supporting a clip 20 in which the front end of the knife or blade 13 is held. It follows that the front end of each blade may descend under a force sufficient only to compress the relatively weak spring 18, and the action of one blade is independent of the other; whereas the boss 16 and collar may not descend without forcing the cross rod 14 downward, and this will require a pressure sufficient to overcome the relatively large spring 7 and in addition the resilience of the spring arm 9.

Attached by suitable means, such as the set screw 21, to the boss 16 is the lower end of a scraper arm 22, the latter rising between the knives 13 as seen in Fig. 4 and carrying at its upper end a blade 23 whose active edge 24 is of a width equal to the distance between the cutting edges of the two knives 13. The parts being assembled as shown in Fig. 2 and the roller R turning in the direction of the arrow, as the material strikes the knives 13 it is severed on parallel lines so as to cut out a strip S and immediately the active edge 24 of the scraper blade 23 scrapes the strip off the face of the roller and deflects it downward as indicated in full lines in Fig. 2, while the remainder of the material passes on as indicated in dotted lines. Should any unevenness or lump in the material occur at a point where it strikes the cutting edge of the knife 13, the same will turn on its pivot 12 and drop at that end where it is supported by the clip, because the clip is held by the plunger and the plunger is sustained by the relatively weak spring 18. Therefore an imperfection in the material M will not work a permanent injury to the knife nor put it out of action, because immediately the lump has passed the knife resumes its normal position and its cutting operation. In Fig. 1 I have shown two pair of these knives disposed at proper intervals on the cross rods 3 and 14, but it is obvious that any suitable number could be employed. It is quite possible also to have several sets of collars 10 and 15 in order to make provision for spacing the cutting edges of the knives therein differently from the spacing herein shown, as when it is desired to cut a wider or a narrower strip. Obviously the knives might be so close together as to cut out a strip which would be so narrow that it was practically of no use, the idea being to sever the material M on clean lines and in such a way that the edges of the parts cut therefrom would not come in contact with each other subsequently. That is to say, with the disposition of the knives shown in Fig. 1, the wide sheet of material would be cut into three narrow sheets whereas the strips between any twin knives would be thrown away. However, I reserve the widest latitude as to the uses to which this machine may be put.

The foregoing description and the drawings have reference to what may be considered the preferred, or approved form of my invention. It is to be understood that I may make such changes in construction and arrangement and combination of parts, materials, dimensions, et cetera, as may prove expedient and fall within the scope of the appended claims.

Having thus fully described my invention, what I claim as new and desire to secure by Letters Patent, is:—

1. In a machine for cutting sheets of material, the combination with a roller around which said material is passed; of standards in which the roller is journaled, a cross rod between said standards, hangers carried by said rod, a second cross rod carried by the hangers, collars adjustably mounted in pairs on said rods, and knives supported by said collars, one end of each knife being pivoted and the other end yieldably supported.

2. In a machine for cutting sheets of material, the combination with a roller around which said material is passed; of standards in which the roller is journaled, a cross rod between said standards, hangers carried by said rod, a second cross rod carried by the hangers, collars adjustably mounted in pairs on said rods, knives pivoted at one end to one collar of each pair, clips on the other ends of the knives, plungers depending from said clips, and springs supporting the plungers from the other collar of said pair.

3. In a machine for cutting sheets of material, the combination with a roller around which said material is passed; of standards in which the roller is journaled, a cross rod between said standards, hangers carried by said rod, a second cross rod carried by the hangers, collars adjustably mounted in pairs on said rods, a series of spaced ears upstanding from one collar of each pair, a plurality of knives pivoted at one end between said ears, a boss upstanding from the other collar of said pair and having a plurality of sockets, springs therein, plungers mounted on said springs, and clips carried by the plungers and sustaining the other ends of said knives.

4. In a cutter of the type described, the combination with a work-carrying roller journaled in upright standards, a pair of hangers next inside said standards, springs on the hangers, boxes supported by the springs, a cross rod carried in said boxes, and a second cross rod connecting the uprights; of a series of pairs of knives pivotally supported at one end on the last-named cross rod, collars on the spring-supported cross rod under the other ends of the knives, and yielding supports for said ends carried by said collars.

5. In a cutter of the type described, the combination with a work-carrying roller journaled in upright standards, a pair of hangers next inside said standards, springs on the hangers, boxes supported by the springs, a cross rod carried in said boxes, and a cross rod connecting the uprights; of a series of pairs of knives pivotally supported at one end on the last-named cross rod, collars on the spring-supported cross rod under the other ends of the knives, means in said collars for supporting such other ends of said knives, and for each pair of knives a scraper carried by said collar with its supporting arm projecting between the knives and its cutting edge contacting with said roller.

6. In a cutting attachment of the type described, the combination with a rigidly supported cross rod having upstanding ears arranged in groups of threes, spring-supported boxes, and a second cross rod mounted in them; of spring-supported clips carried by the last-named rod opposite said group, and twin knives pivoted at one end in the spaces between said ears and supported at their other ends in said clips.

7. In a scraper of the class described, the combination with a fixed cross rod, a series of collars adjustably mounted thereon and each having a group of three upstanding ears, a spring supported cross rod, and a like series of collars adjustably mounted thereon and each having an upstanding boss containing two sockets; of plungers mounted in said sockets and each carrying a clip, knives disposed in pairs pivoted at one end between said ears and resting at their other ends in said clips, and for each pair of knives a scraper blade mounted on one of said bosses.

In testimony whereof I affix my signature in presence of two witnesses.

CHARLES W. BOARD.

Witnesses:
D. G. HAY,
B. MARINUS.

Copies of this patent may be obtained for five cents each, by addressing the "Commissioner of Patents, Washington, D. C."